Figure 1:
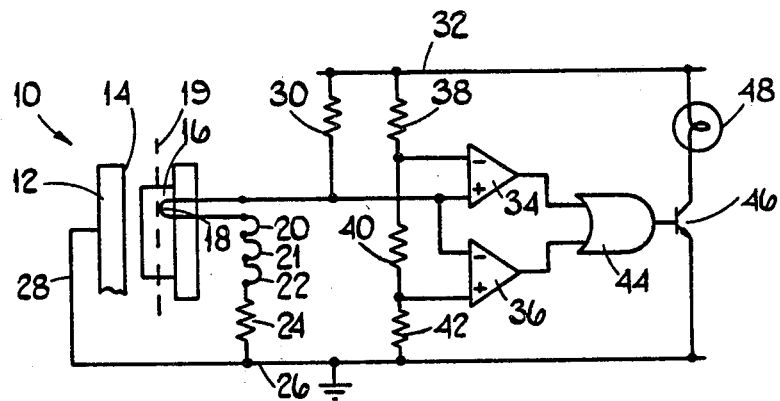

United States Patent [19]

Wiley et al.

[11] 4,204,190
[45] May 20, 1980

[54] BRAKE PAD WEAR DETECTION SYSTEM

[75] Inventors: David Wiley, Brownhills; David G. Williams, Birmingham, both of England

[73] Assignee: Lucas Industries Limited, Birmingham, England

[21] Appl. No.: 966,724

[22] Filed: Dec. 5, 1978

[30] Foreign Application Priority Data

Dec. 7, 1977 [GB] United Kingdom ............... 51237/77

[51] Int. Cl.² ............................................. B60T 17/22
[52] U.S. Cl. ................................. 340/52 A; 200/61.4; 188/1 A
[58] Field of Search ........................... 340/52 A, 52 B; 200/61.4, 61.44; 188/1 A

[56] References Cited

U.S. PATENT DOCUMENTS 3,675,197  7/1972  Bennett et al. ..................... 340/52 A

FOREIGN PATENT DOCUMENTS 2137097  2/1973  Fed. Rep. of Germany .

Primary Examiner—Alvin H. Waring
Attorney, Agent, or Firm—Ladas, Parry, Von Gehr, Goldsmith & Deschamps

[57] ABSTRACT

A brake pad wear detection system comprises a brake having a brake pad and a conductive braking face, the brake pad and the conductive braking face engaging during braking. A sensor loop is embedded in the brake pad and positioned to be broken when the wear to the brake pad exceeds the working limit. An indicator means and a detecting means for operating the indicator means are provided, the detecting means detecting contact between the sensor loop and the braking face as well as breakage of the sensor loop.

5 Claims, 2 Drawing Figures

U.S. Patent         May 20, 1980         4,204,190

BRAKE PAD WEAR DETECTION SYSTEM

The present invention relates to a brake pad wear detection system which includes a sensor loop embedded in a brake pad, the sensor loop being broken when the wear to the pad reaches the working limit.

Known brake pad wear detection systems include a detecting means which permanently energises an indicator means when the sensor loop is broken. However, such systems suffer from the problem that no warning is given when the wear to the pad is approaching the working limit.

It is accordingly an object of the present invention to provide a new or improved brake pad wear detection system in which the above mentioned problem is overcome or reduced.

According to the present invention there is provided a brake pad wear detection system comprising a brake having a brake pad and a conductive braking face, the brake pad and the conductive braking face engaging during braking, a sensor loop embedded in the brake pad and positioned so as to be broken when the wear to the brake pad exceeds the working limited, an indicator means, and a detecting means, characterised in that the detecting means detects contact between the sensor loop and the braking face and also breakage of the sensor loop, the detecting means operating the indicator means upon contact between the braking face and the sensor loop and also breakage to the sensor loop.

By providing a detecting means which detects contact between the sensor loop and the braking face as well as the breakage of the sensor loop, it is ensured that warning will be given when wear to the pad is approaching the working limit.

Figure 2:
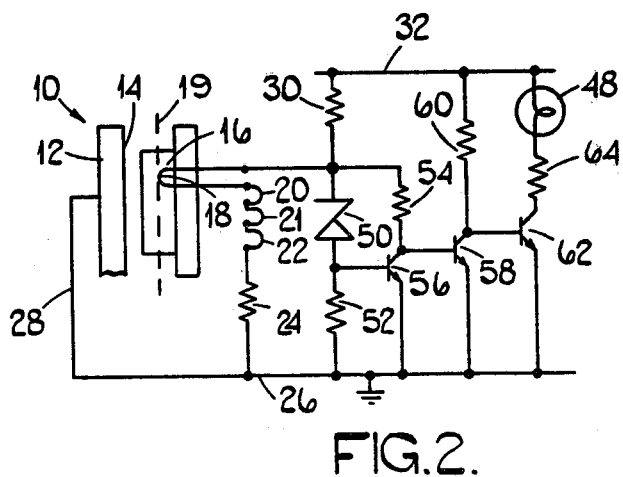

The present invention will now be described in more detail with reference to the accompanying drawings, in which:

FIG. 1 is a circuit diagram of a brake pad wear detection system, embodying the present invention; and FIG. 2 is a circuit diagram of another brake pad wear detection system embodying the present invention.

Referring now to FIG. 1, there is shown a brake pad wear detection system installed in a road vehicle. The system includes four brakes, only one 10 of which is shown, and which may be conventional drum or disc brakes associated respectively with the four wheels of the vehicle. The brake 10 includes a metal braking member 12 having a conductive braking face 14, which may be the disc of a disc brake or drum of a drum brake, and a brake pad 16 mounted to engage the face 14 under pressure during braking.

In order to detect wear to the pad 16, it is provided with a sensor loop 18 positioned at the normal working limit, indicated by a dashed line 19. The loop 18 is connected in series with loops 20, 21, 22 provided in the brake pads of the other three brakes.

The loop 22 is connected through a resistor 24 to a line 26 earthed to the vehicle body. The braking member 12 is also connected to the line 26 as indicated diagrammatically by the line 28 though in practice this connection will be made through parts of the brake 10 and the vehicle body.

The loop 18 is connected through a resistor 30 to a positive supply line 32 and the common point of the resistor 30 and the loop 18 is connected to the non-invert input of a comparator 34 and to the invert input of a comparator 36. Resistors 38, 40 and 42 are connected in series between the lines 32 and 26, the common point of resistors 38 and 40 being connected to the invert input of comparator 34, and the common point of resistors 40 and 43 being connected to the non-invert input of comparator 36. The values of the resistors 24, 30, 38, 40 and 42 are chosen so that normally the voltage at the common point of resistor 30 and loop 18 is less than that at the common point of resistors 38 and 40 and greater than that at the common point of resistors 40 and 42. The outputs of comparators 34 and 36 are connected to the two inputs of an OR gate 44, the output of which is connected to the base of an n-p-n transistor 46. The collector of transistor 46 is connected to line 32 through an indicator lamp in the form of a lamp 48 and the emittor is connected to the line 26. Resistors 38, 40 and 42, comparators 34 and 36, OR gate 44, and transistor 46 comprise a detecting means.

In operation, when the pads are new or not sufficiently worn to expose their sensor loops 18, 20, 21, 22, the outputs of both comparators 34 and 36 will be at earth potential at all times, and consequently the output of the OR gate 44 will also be at earth potential thereby rendering the transistor 46 non conductive and preventing current flow through the lamp 48. When the wear to one of the pads has progressed sufficiently far to expose its sensor loop, the loop will be earthed as a result of contact with the braking face 14 during each operation of the brake 10. This will cause the output of comparator 36, and consequently OR gate 44, to go high, with the result that the transistor 46 will be rendered conductive and lamp 48 will be energised. When the wear to one of the pads has progressed sufficiently to break its loop the voltage at the non-invert input of comparator 34 will reach the voltage of line 32 and consequently the output voltage of the comparator 34 and also the OR gate 44 will go high, thereby rendering the transistor 46 conductive and permanently energising the lamp 48.

Referring now to FIG. 2, there is shown a brake pad wear detection system generally similar to the system shown in FIG. 1 and like parts have been denoted by the same reference numerals. In this system, the common point of resistor 30 and loop 18 is connected through a zener diode 50 and a resistor 52 to the line 26, and through a resistor 54 to the collector of a transistor 56, the base of which is connected to the common point of zener diode 50 and resistor 52, and the emitter of which is connected to line 26. The collector of transistor 56 is also connected to the base of a transistor 58, the collector of which is connected through a resistor 60 to the line 32 and the emitter of which is connected to the line 26. The collector of transistor 58 is also connected to the base of a transistor 62, the collector of which is connected through a resistor 64 and the lamp 48 to the line 32, and the emitter of which is connected to the line 26.

The values of the resistors 24 and 30 and the breakdown voltage of zenor diode 50 are chosen so that the zener diode 50 only conducts when the loop 18 is broken.

In operation, when none of the pads are sufficiently worn to expose their sensor loops, the transistor 58 will be conductive, thereby rendering the transistor 62 non-conductive and preventing current flowing through the lamp 48. When wear to one of the pads has progressed sufficiently far to expose its sensor loop but not sufficiently far to break its loop, the base of transistor 58 will be connected to earth during each operation of the brake 10, thereby rendering the transistor 58 non-conductive, the transistor 62 conductive and energising the lamp 48. When the wear has progressed sufficiently far to break one of the loops, the voltage at the common point of resistor 30 and zener diode 50 will rise and cause breakdown of the zener diode 50, thereby rendering the transistor 56 conductive, the transistor 58 non-conductive, the transistor 62 conductive, and permanently energising the lamp 48.

Thus, with both of the systems described above, when the wear to one of the pads approaches its working limit, the lamp 48 will be energised during each operation of the brake, and when the wear to one of the pads has reached its working limit and broken its sensor loop, the lamp 48 will be permanently energised, thereby providing a progressive warning of wear to the pad.

In both of the systems described above, if owing to a fault one of the loops becomes disconnected, the lamp 48 will be energised. Also if after one of the loops has broken, part of the loop engages the working face 14 and consequently earths the common point of resistor 30 and loop 18, the lamp will also be energised. Thus, in these two respects, the systems are fail-safe.

Although in the systems described above, each brake is provided with only one pad, in the case of a disc brake two pads are usually provided and, if it is desired to detect wear in both pads of each brake, this may be achieved by connecting the two loops of the two pads of each brake in series.

Also, instead of connecting the loops of all four wheels in series, separate systems may be provided for the front and rear wheels, the loops of the pads associated with each system being connected in series.

I claim:

1. A brake pad wear detection system comprising a brake having a brake pad and a conductive braking face, the brake pad and the conductive braking face engaging during braking, a voltage supply line, an earth line, a first impedance means one end of which is connected to the voltage supply line, a second impedance means one end of which is connected to the earth line, a sensor loop connected in series between the first and second impedance means and embedded in the brake pad and positioned so as to be broken when the wear to the pad exceeds the working limit, indicator means and means connected to the common point of the first impedance means and the sensor loop for detecting if the potential at said common point is between first and second predetermined voltages, the detecting means operating the indicator means upon contact between the braking face and the sensor loop and also upon breakage of the sensor loop.

2. A detection system as claimed in claim 1 in which the indicator means comprises a single lamp which is energised temporarily during contact between the braking face and the sensor loop, and permanently upon breakage of the sensor loop.

3. A detection system as claimed in claim 1 or 2 in which the detecting means includes a first comparator for comparing the potential at said common point with the first predetermined voltage and a second comparator for comparing the potential at said common point with the second predetermined voltage.

4. A detection system as claimed in claim 1 or 2 in which the first impedance means comprises a first resistor and the second impedance means comprises a second resistor and in which the detecting means includes a zener diode and a third resistor connected in series between said common point and the earth line, a first transistor, the emitter of which is connected to the earth line and the base of which is connected to the common point of the zener diode and the third resistor, and a second transistor, the emitter of which is connected to the earth line and the base of which is connected to the collector of the first transistor and through a fourth resistor to the common point of said first resistor and the sensor loop, the indicator means being controlled by the second transistor.

5. A detection system as claimed in claim 1 or 2 in which there are a plurality of brakes, each brake having an associated brake pad, conductive braking face and sensor loop embedded in the brake pad, the sensor loops being connected in series.

* * * * *